United States Patent [19]

Swarthout

[11] Patent Number: 4,470,641
[45] Date of Patent: Sep. 11, 1984

[54] LAMINATED TRACK PAD FOR TRACKED VEHICLES

[75] Inventor: Richard L. Swarthout, Wayne, Mich.

[73] Assignee: The United States of America as represented by the Secretary of the Army, Washington, D.C.

[21] Appl. No.: 422,802

[22] Filed: Sep. 24, 1982

[51] Int. Cl.³ .................. B62D 55/26; B62D 55/28
[52] U.S. Cl. .................................. 305/35 R; 305/51; 305/54
[58] Field of Search ............... 305/35 R, 36, 51, 54

[56] References Cited

U.S. PATENT DOCUMENTS

| | | | |
|---|---|---|---|
| 2,369,130 | 2/1945 | Benson | 305/35 R |
| 2,375,170 | 5/1945 | McNeil | 305/36 |
| 3,261,646 | 7/1966 | Pax | 305/35 R |
| 4,027,925 | 6/1977 | Black et al. | 305/51 X |

FOREIGN PATENT DOCUMENTS

| | | | |
|---|---|---|---|
| 1034049 | 7/1958 | Fed. Rep. of Germany | 305/35 R |
| 1259966 | 5/1961 | France | 305/36 |
| 969732 | 9/1964 | United Kingdom | 305/36 |

Primary Examiner—David A. Scherbel
Attorney, Agent, or Firm—Peter A. Taucher; John E. McRae; Robert P. Gibson

[57] ABSTRACT

In a tracked vehicle, especially a military vehicle, it is proposed to construct individual track pads so that their terrain-engagement surfaces are formed by a series of laminations; individual laminations have their mating surfaces bonded together to interrupt and resist shearing forces. A particular aim of the invention is to improve the service life of the track pad, especially as regards prevention of fracture, cracks and chunking in the terrain-engaging surface of the pad.

1 Claim, 3 Drawing Figures

LAMINATED TRACK PAD FOR TRACKED VEHICLES

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to an elastomeric track pad especially useful on the endless tracks of tanks and similar military vehicles. A particular object of the invention is to provide an elastomeric pad that at least partially avoids the problem of chunking. The term chunking here refers to the formation of large deep holes or gouged-out areas in the ground-engagement surface of the track pad. The cause of the chunking is not entirely understood; however it is known that the pad can be subjected to high localized forces due to such factors as skidding and/or side hill contact on partial areas of the pad and/or edge area engagements as the pad first contacts the ground and later leaves the ground. The high localized forces may be at least partly responsible for the chunking effect on the pad surface.

To minimize the chunking effect I propose a laminated pad design wherein the ground-engagement portion of the pad is defined by a large number of relatively thin elastomeric laminations. Fractures initiated in a given lamination are interrupted at the laminate surface, thus minimizing the depth of the chunking effect and prolonging the service life of the pad.

THE DRAWINGS

Figure 1:
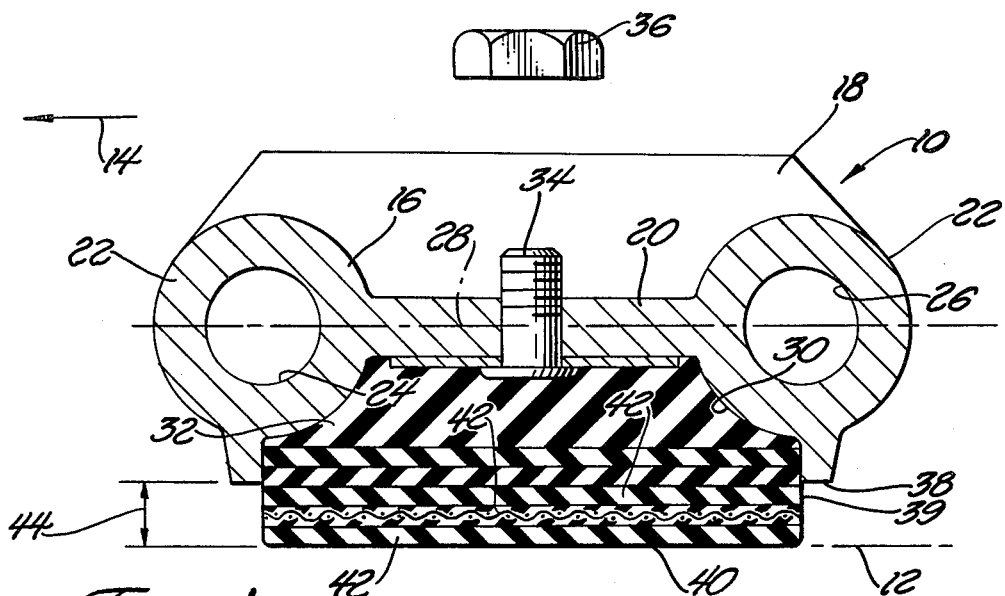
FIG. 1 is a transverse sectional view taken through a shoe-pad assembly embodying my invention.

Referring in greater detail to FIG. 1, there is shown a shoe-pad assembly 10 adapted to engage terrain surface 12 to move a non-illustrated vehicle forwardly in the arrow 14 direction. The metallic shoe 16 comprises a raised wheel-engagement area 18, relatively thin web 20 near the outer edge of the shoe, and thickened sections 22 having transverse holes 24 and 26 running therethrough to receive non-illustrated connector pins. Holes 24 and 26 define the general plane 28 of the shoe, i.e. the approximate mid plane parallel to terrain surface 12.

The undersurface of the shoe defines a cavity 30 adapted to receive a removable, replaceable elastomeric pad 32. Attachment of the pad to the shoe can be accomplished by studs 34 that are molded into the pad during manufacture; a nut 36 is threaded onto each stud to retain the associated pad 32 within cavity 30.

It will be seen that the elastomeric pad includes an exposed portion 39 extending downwardly beyond the confining edge 38 of the metallic shoe to define the deformable pad section that engages the terrain during operation of the vehicle. The exposed deformable pad section has a generally flat major face 40 extending parallel to the general plane 28 of the shoe, whereby face 40 has extensive surface area engagement with the terrain, at least during most of the period while the pad is carrying the vehicle weight.

At least the exposed deformable portion 39 of pad 32 is formed as a laminated structure comprised of a series of relatively thin elastomeric sheets 42 extending parallel to the pad major face 40. Adjacent ones of the sheets have their interfacial surfaces bonded together, either by adhesives or by vulcanization action during initial pad formation in a non-illustrated mold cavity. FIG. 1 shows five sheets 42, but the number of sheets may be varied. In a representative construction the depth dimension 44 of the exposed deformable portion of the pad is slightly greater than one inch. It is intended that the individual sheets would be no more than about one half inch thick, although the optimum is expected to be three sixteenth inch thick. Optimally then, the number of laminations 42 would then be five, and probably more. Actual road tests will have to be run to determine the optimum number of sheets and sheet thickness ranges.

The durometers and thicknesses of the individual sheets 42 may differ. For example, it may be found that the lowermost sheet should have a relatively high durometer to better withstand scuffing and abrasion forces, whereas the other sheets can have lower durometers to better flex and stretch under deformation forces. At least some of the sheets may be internally reinforced with fabric cords. The cords may be conventional cords used in tire manufacture, e.g., cotton, rayon, nylon, ployester, glass fiber, or steel. Cords in different sheets may run in different directions to provide reinforcement in all major directions paralleling face 40. U.S. Pat. Nos. 3,558,389 and 3,667,529 and 3,918,506 and 4,201,260 describe methods of incorporating reinforcement cords into elastomeric belts or plies. I contemplate that such processes would be used to form the reinforced elastomeric sheets 42 in the improved track pad.

Figure 3:
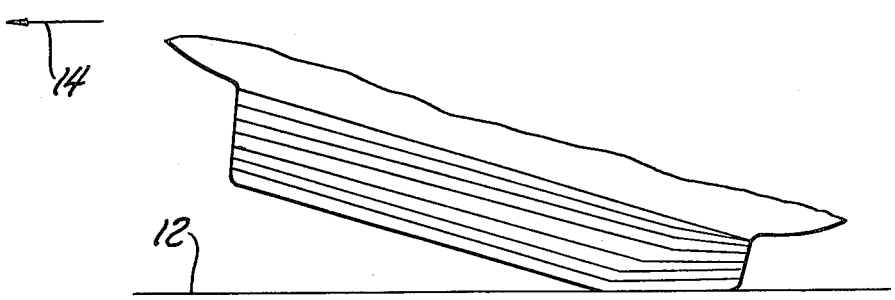
FIG. 3 is a diagrammatic view of a laminated pad while subjected to a localized load at the pad trailing edge.

The laminated pad is believed to be superior to the conventional non-laminated pad in that an individual lamination can stretch and/or deform without transmitting the entire strain to the adjacent lamination. Fracture generated in the affected lamination can stop or terminate at the lamination interface. FIG. 3 shows generally how the laminated pad locally deforms as the pad starts to contact terrain surface 12 during motion of the vehicle in the arrow 14 direction; a similar effect occurs as the pad leaves the terrain surface. The load is initially applied locally to the trailing edge of the pad, causing deformation and some stretching of the individual sheets. The lowermost sheet probably deforms and stretches to the greatest extent because it has the largest deformed surface. Deformation and stretch becomes progressively less from the lower sheet to the upper sheet. A fracture generated in the lower sheet is interrupted at the surface of the next sheet, thus minimizing the depth of the potential hole or depression that may form in pad surface 40.

Figure 2:
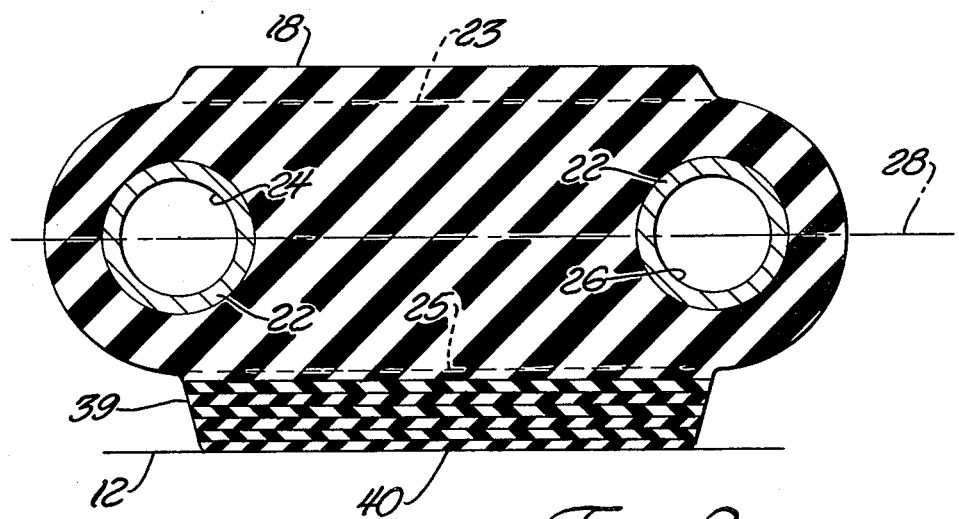
FIG. 2 is a sectional view through another shoe-pad assembly embodying my invention.

My invention can be embodied in other shoe-pad assemblies than that of FIG. 1. For example, FIG. 2 shows an assembly wherein the metallic shoe is formed by two parallel tubes 22, 22 connected at their ends to flat end plates having upper edges 23 and lower edges 25. The elastomeric pad 32 is molded around tubes 22 in the space between the end plates. Pad portion 39 below plate edges 25 constitutes the exposed deformable pad section. This exposed part of the pad is formed as a laminated structure of the same general nature as the laminated construction in FIG. 1. The entire pad could be of laminated design, but the principal area where the lamination is needed is the exposed pad portion 39 which undergoes most, if not all, of the deformation and stretching load forces. Upper confined portions of the pad undergo little, if any deformation; hence they are preferably not of laminated design. U.S. patents known to show reinforcement mechanisms for elastomeric track pads are Scheckel U.S. Pat. No. 1,886,839 and Knox U.S. Pat. No. 1,966,450 and Colby et al. U.S. Pat. No. 2,012,958 and Benson U.S. Pat. No. 2,369,130. Benson U.S. Pat. No. 2,369,130 appears to represent the closest approach to my design. In the Benson patent the elastomeric pad comprises a terrain-engagement layer 2 of very hard rubber bonded to metallic track shoe 1 via a layer 7 of crepe rubber and a hard rubber layer 6. Elastomeric layer 2 has a number of slots or holes in its exposed surface adapted to receive reinforcement inserts 3. Each insert 3 includes calendered cords 8 and 9 arranged with the cord ends exposed to the road surface; the cords apparently act like bristles in brooms or brushes. It is not entirely clear how the individual inserts 3 would be installed and retained in the slots or holes in rubber layer 2. The tread layer 2 appears to be considerably thicker than each layer 6 or 7; apparently Benson uses layers 7 and 6 only to facilitate attachment of tread layer 2 to the metallic support plate 1. It is believed that the Benson pad would act essentially as a solid one-piece structure. I contemplate a laminated pad structure comprised of a relatively large number of thin elastomeric laminations, whereby strain forces are interrupted at each lamination interface to minimize chunking effects. I intend that each elastomeric lamination will be formed from a relatively tough solid elastomer; I would avoid the use of relatively porous fragile crepe rubber, as proposed by Benson. My invention is intended primarily for use in military tanks or similar vehicles weighing upwards of forty tons.

I wish it to be understood that I do not desire to be limited to the exact details of construction shown and described for obvious modifications will occur to a person skilled in the art.

I claim:

1. For use on an endless tracked vehicle, the combination comprising a metallic track shoe having transverse connector holes therethrough defining the general plane of the shoe; and an elastomeric pad carried on the metallic shoe, said pad comprising a relatively rigid non-deformable mounting portion arranged within the shoe to transmit terrain-generated forces thereto, and an exposed terrain-engagement portion integral with said mounting portion, said exposed terrain-engagement portion extending beyond a confining edge area of the shoe to provide a deformable pad section engageable with the terrain during operation of the vehicle; said exposed deformable pad section having a generally flat major face extending parallel to the general plane of the shoe for extensive surface area engagement with the terrain; the exposed section of the pad being a laminated structure comprised of a plurality of elastomeric sheets extending parallel to the aforementioned major face, adjacent ones of the elastomeric sheets having their mating surfaces bonded together so that the laminated structure resists delamination shearing forces; the laminations being constructed to prevent fracture in the pad major face from causing massive chunking damage to the pad; the exposed deformable pad section being approximately one inch thick, with each lamination being approximately three sixteenth inch thick whereby said pad section has at least five laminations; the outermost lamination being formed of an elastomer having a relatively high durometer for withstanding scuffing and abrasion forces generated by the terrain, and the remaining laminations being formed of elastomers having relatively low durometers for optimum flexing and stretching action in response to deformation forces; at least some of said remaining laminations being reinforced by means of fabric cords running parallel to the lamination plane; the fabric cords in different laminations running in different directions to provide reinforcement in different directions paralleling the major face of the deformable pad section.

* * * * *